US010783161B2

(12) United States Patent
Bhide et al.

(10) Patent No.: US 10,783,161 B2
(45) Date of Patent: Sep. 22, 2020

(54) GENERATING A RECOMMENDED SHAPING FUNCTION TO INTEGRATE DATA WITHIN A DATA REPOSITORY

(71) Applicant: International Business Machines Corporation, Armonk, NY (US)

(72) Inventors: Manish Bhide, Hyderabad (IN); Shabharesh Gudla, Kharagpur (IN); Sameep Mehta, New Delhi (IN); Prishni Rateria, Kharagpur (IN); Samiulla Shaikh, Bangalore (IN); Neelesh K. Shukla, Lucknow (IN); Paul S. Taylor, Redwood City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 15/843,787

(22) Filed: Dec. 15, 2017

(65) Prior Publication Data

US 2019/0188307 A1 Jun. 20, 2019

(51) Int. Cl.
| | |
|---|---|
| *G06F 7/02* | (2006.01) |
| *G06F 16/00* | (2019.01) |
| *G06F 16/25* | (2019.01) |
| *G06F 16/248* | (2019.01) |
| *G06F 16/84* | (2019.01) |

(52) U.S. Cl.
CPC .......... *G06F 16/254* (2019.01); *G06F 16/248* (2019.01); *G06F 16/84* (2019.01)

(58) Field of Classification Search
CPC ...... G06F 16/254; G06F 16/248; G06F 16/00; G06F 16/84
See application file for complete search history.

(56) References Cited

U.S. PATENT DOCUMENTS

| | | | |
|---|---|---|---|
| 7,814,470 B2 | 10/2010 | Mamou et al. | |
| 8,041,760 B2 | 10/2011 | Mamou et al. | |
| 8,060,553 B2 | 11/2011 | Mamou et al. | |
| 9,336,253 B2 | 5/2016 | Gorelik et al. | |
| 10,216,814 B2* | 2/2019 | Allan | ...................... G06F 8/433 |
| 2002/0169735 A1 | 11/2002 | Kil et al. | |
| 2009/0282058 A1* | 11/2009 | Russell | ..................... G06F 8/71 |
| 2014/0372346 A1 | 12/2014 | Phillipps et al. | |
| 2015/0242409 A1 | 8/2015 | Frohock et al. | |

(Continued)

*Primary Examiner* — Bruce M Moser
(74) *Attorney, Agent, or Firm* — Cantor Colburn LLP; Richard Wilhelm

(57) ABSTRACT

A method includes determining, by a controller, a portion of data that is selected by a user. The portion of data includes source data that is to be transformed by at least one shaping function. The method also includes generating, by the controller, a first output recommendation data that communicates at least one recommended shaping function to apply to the portion of data. The first output recommendation data is generated based on patterns of shaping functions that have been previously chosen. The patterns of shaping functions that have been previously chosen can be chosen by a plurality of system users. The method also includes determining whether to apply the at least one recommended shaping function to the portion of data. The method also includes applying the at least one recommended shaping function based on the determining.

15 Claims, 7 Drawing Sheets

(56) References Cited

U.S. PATENT DOCUMENTS

| | | | |
|---|---|---|---|
| 2015/0347261 A1* | 12/2015 | Li | G06F 16/254 |
| | | | 707/602 |
| 2016/0171229 A1* | 6/2016 | Antic | G06F 16/95 |
| | | | 707/602 |
| 2016/0328406 A1 | 11/2016 | Convertino et al. | |
| 2017/0024446 A1* | 1/2017 | O'Kane | G06F 16/254 |
| 2017/0308595 A1* | 10/2017 | Dey | G06N 20/00 |
| 2018/0074786 A1* | 3/2018 | Oberbreckling | G06F 7/02 |
| 2018/0129719 A1* | 5/2018 | Kim | G06F 16/258 |
| 2018/0144314 A1* | 5/2018 | Miller | G06Q 20/14 |
| 2018/0341839 A1* | 11/2018 | Malak | G06F 40/30 |

* cited by examiner

GENERATING A RECOMMENDED SHAPING
FUNCTION TO INTEGRATE DATA WITHIN
A DATA REPOSITORY

BACKGROUND

The present invention relates in general to generating a recommended shaping function to integrate data within a data repository. More specifically, the present invention relates to recommending shaping functions to users of a data integration platform based on previous user choices, where the previous user choices can be made by other users in a similar situation as the present users.

An extract, transform, and load (ETL) process is a computing process where: (1) data can be extracted from one or more sources, (2) the extracted data is transformed into a proper format or structure, and (3) the transformed data is loaded into a target storage repository/database. When transforming the data, one or more shaping functions are applied to the data in order to transform the data into the proper format/structure.

SUMMARY

A method according to one or more embodiments of the invention includes determining, by a controller, a portion of data that is selected by a user. The portion of data includes source data that is to be transformed by at least one shaping function. The method also includes generating, by the controller, a first output recommendation data that communicates at least one recommended shaping function to apply to the portion of data. The first output recommendation data is generated based on patterns of shaping functions that have been previously chosen. The patterns of shaping functions can be previously chosen to be applied to data that is similar to the portion of data that is selected by the user. The method also includes determining whether to apply the at least one recommended shaping function to the portion of data. The method also includes applying the at least one recommended shaping function based on the determining.

A computer system according to one or more embodiments of the invention includes a memory and a processor system communicatively coupled to the memory. The processor system is configured to perform a method that includes determining a portion of data that is selected by a user. The portion of data includes source data that is to be transformed by at least one shaping function. The method also includes generating a first output recommendation data that communicates at least one recommended shaping function to apply to the portion of data. The first output recommendation data is generated based on patterns of shaping functions that have been previously chosen. The patterns of shaping functions can be previously chosen to be applied to data that is similar to the portion of data that is selected by the user. The method also includes determining whether to apply the at least one recommended shaping function to the portion of data. The method also includes applying the at least one recommended shaping function based on the determining.

A computer program product according to one or more embodiments of the invention includes a computer-readable storage medium having program instructions embodied therewith. The program instructions are readable by a processor system to cause the processor system to determine a portion of data that is selected by a user. The portion of data comprises source data that is to be transformed by at least one shaping function. The processor system is also caused to generate a first output recommendation data that communicates at least one recommended shaping function to apply to the portion of data. The first output recommendation data is generated based on patterns of shaping functions that have been previously chosen. The patterns of shaping functions can be previously chosen to be applied to data that is similar to the portion of data that is selected by the user. The processor system is also caused to determine whether to apply the at least one recommended shaping function to the portion of data. The processor system is also caused to apply the at least one recommended shaping function based on the determining.

BRIEF DESCRIPTION OF THE DRAWINGS

The subject matter of one or more embodiments of the present invention is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
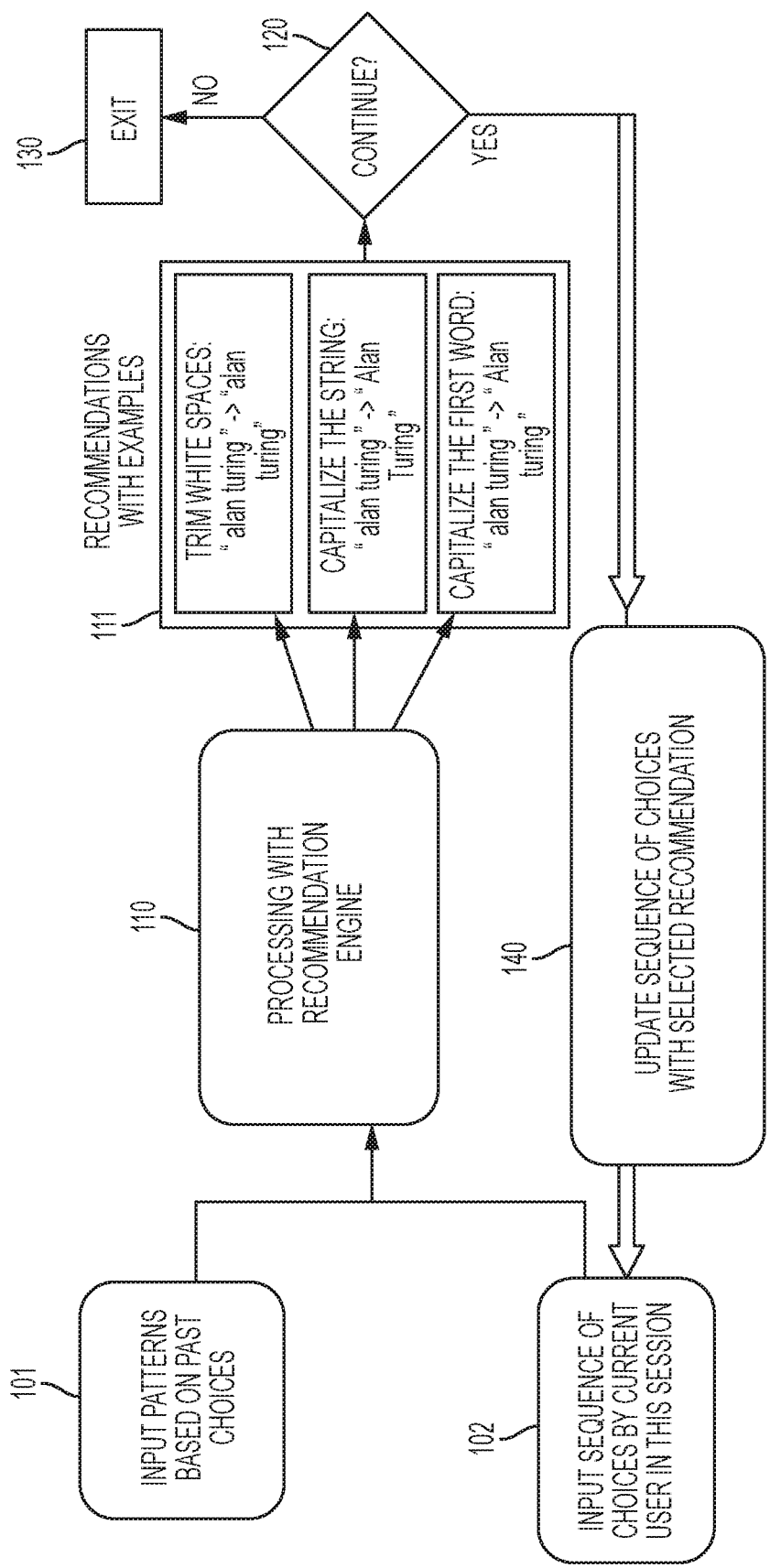
FIG. 1 illustrates a flowchart for recommending shaping functions in accordance with one or more embodiments of the present invention.

In accordance with one or more embodiments of the present invention, methods and computer program products for recommending shaping functions based on previous user choices are provided. The previous user choices can be made by other users of a same data integration platform. Various embodiments of the present invention are described herein with reference to the related drawings. Alternative embodiments of the present invention can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments of the present invention whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

As described above, a user of a data integration platform can perform an ETL process in order to integrate data within target data repositories. Specifically, the ETL process can import data from various source data repositories, join and transform the imported data, and store the transformed data within various target data repositories. The data integration platform can use one or more shaping functions to transform the data. The transforming shaping functions can be applied to a single field or to a plurality of fields of the data that is to be transformed.

Data integration platforms provide a wide range of different shaping functions that users can choose to apply to data that is to be transformed. Examples of shaping functions include "string-to-date" functions (where a string data is transformed into a date), "trim-spaces" functions (where spaces are removed from data), trigonometric functions, and/or "split-on-char" functions (where a character within a string splits the string into two parts), for example. However, the users, who may be data engineers/scientists, are generally unfamiliar with the detailed functionalities that are provided by each of the different shaping functions. As such, the users can have difficulty determining which of the different shaping functions to use in order to properly transform/integrate the data that is to be transformed. In order for the users to properly determine the correct shaping functions to use, the users typically have to spend a large amount of time and resources in order to familiarize themselves with the functions of each shaping function.

In view of the above-described difficulties that users encounter when determining which shaping functions to choose in order to transform data, one or more embodiments of the present invention generate one or more recommended shaping functions based on previous user choices. Specifically, one or more embodiments of the present invention can generate one or more recommended sequences of shaping functions that are based on sequences of shaping functions that have been previously selected by users. A sequence of shaping functions can be a plurality of shaping functions that are applied in a certain order to transform data. Therefore, by viewing the one or more recommended shaping functions, users can more readily determine which shaping functions to apply. Further, as described in more detail below, one or more embodiments of the present invention can display an example of how each recommended shaping function, if applied, would modify the selected data. Therefore, by viewing an example of how each recommended shaping function would be applied, the users can more readily determine which recommended shaping function to apply.

In order to recommend a sequence of shaping functions to transform data that a current user has selected, one or more embodiments of the present invention can recommend a sequence of shaping functions that was previously selected to transform other data that is similar to the data that the current user has selected. For example, the other data and the selected data can share at least one common characteristic, as described in more detail below. One or more embodiments of the present invention can also recommend a sequence of shaping functions based on a time that the user selects the data. Upon determining which shaping functions were chosen by previous users, and upon determining the time when the previous users applied their selected shaping functions, one or more embodiments of the present invention can automatically learn the different kinds of sequences of shaping functions that were chosen and applied. Thus, upon learning the different shaping functions which were previously chosen and upon learning how the different shaping functions were applied, one or more embodiments of the present invention can automatically learn which sequences of functions to recommend (and at what time) using machine learning, for example. The sequences of functions to recommend can be learned from past user choices using machine-learning techniques including, but not limited to, association rule learning, sequential rule learning, language modelling, etc.

With one or more embodiments of the present invention, a computer-implemented recommendation engine can perform the function of learning the different shaping functions which were previously chosen and applied, and the recommendation engine can thus perform the function of recommending the learned shaping functions. The recommendation engine can be a processor of a data integration platform, or the recommendation engine can work in conjunction with the data integration platform.

One or more embodiments of the present invention can automatically determine/learn that users have previously chosen an example sequence of shaping functions based on a format of the data that is to be transformed. For example, suppose that previous users have chosen an example sequence of shaping functions where the selected source data is formatted as "@ @ @-####" (where "@" represents characters, and where "#" represents numerical digits). In this example, "@ @ @" can provide an indication of a country, and "####" can provide an indication of an employee number, for example.

As such, when the source data is formatted as "@ @ @-####," the learned chosen sequence of shaping functions can create a new column to store the characters "@ @ @" within the new column. Further, suppose the learned chosen sequence then uses the stored characters of "@ @ @" to determine a country name by using the characters to look up a country name. For example, stored characters of "744" can possibly map to a country of "India." As such, one or more embodiments of the present invention can automatically determine/learn this example sequence of shaping functions that can perform the above-described function when the selected source data matches a specific format.

One or more embodiments of the present invention can also automatically determine/learn that users have previously chosen an example sequence of shaping functions based on both: (1) a current time, and (2) a format of the data that is to be transformed. For example, suppose that previous users have chosen an example sequence of shaping functions where (1) the current time is the end of the month, and (2) the selected source data is formatted as a "date."

As such, when (1) the current time is the end of the month, and (2) the selected source data is formatted as a "date," the chosen sequence of shaping functions determines a month from the "date" field and then arranges the data by aggregating groupings of the data based on the determined month of the "date" field. As such, one or more embodiments of the present invention can automatically determine/learn this example sequence of shaping functions that can perform the above-described function when the current time matches a certain time and when the selected source data matches a specific format.

As another example sequence of shaping functions that are recommended (to users) based on a current time and a format of the selected source data, suppose that an example sequence of shaping functions is performed at the end of each financial quarter when the source data has a field of type "date." Further, suppose that performing the example sequence of shaping functions includes extracting a quarter/month from the "date" and grouping the source data by the extracted quarter/month. As such, one or more embodiments of the present invention can determine/learn this example sequence of shaping functions that perform the above-described function when the current time matches a certain time and when the selected source data matches a specific format.

One or more embodiments of the present invention can also automatically determine/learn that users have previously chosen an example sequence of shaping functions based on a class of data. Certain data can be assigned a more important class to indicate that such data should be protected. For example, credit card data can be assigned a higher class so that this data is protected. When the selected source data includes credit card numbers, the chosen sequence of shaping functions can mask the data that corresponds to the credit card numbers. As such, one or more embodiments of the present invention can automatically determine/learn this example sequence of shaping functions that perform the above-described function when the selected data matches a class of data (i.e., a credit card data).

With another example, suppose that an example sequence of shaping functions is performable if the selected source data includes a person's name and a field of data that corresponds to a zip code of each person. Further, suppose that performing the example sequence of shaping functions includes masking the person's name. The example sequence can apply the masking function in order to protect the identities. As such, one or more embodiments of the present invention can determine/learn this example sequence of shaping functions that perform the above-described function when the selected source data matches a specific class of data.

One or more embodiments of the present invention can also automatically determine/learn that users have previously chosen an example sequence of shaping functions based on one or more tables of data. The example sequence can select one or more tables which can be joined with one or more selected columns. In this example, suppose the example sequence selects a "Customer" table and also selects an "Orders" table. Suppose further that the example sequence joins the two tables by referring to a customer identifier of the "Customer" table (i.e., "customer.cust_id" of "Customer" table) and by referring to another customer identifier of the "Orders" table (i.e., "orders.c_id" of "Orders" table). As such, one or more embodiments of the present invention can automatically determine/learn this example sequence of shaping functions that can perform the above-described function based on one or more tables of data.

One or more embodiments of the present invention can automatically determine/learn that users have previously chosen an example sequence of shaping functions based on a datatype of data. With this example, if the selected source data is a table that contains a column of datatype "VarBinary," then the example sequence of shaping functions can remove the column, for example. As such, one or more embodiments of the present invention can automatically determine/learn this example sequence of shaping functions that perform the above-described function based on one or more datatypes of data.

When a user selects data for performing an ETL process upon, one or more embodiments of the present invention can perform the followings steps. One or more embodiments of the present invention can first automatically perform profiling of the selected data in order to determine: (1) a class that the data belongs to, and (2) a format of the data. An example class can be, for example, a U.S. State or a credit card number. An example format of the data can be a format of "@ @ @-####." The process of automatically profiling selected data can either be performed on the entire selected data or performed on a sample portion of the selected data.

After profiling the selected data, one or more embodiments of the present invention can then determine the sequence of shaping functions that can be recommended to the user based on the selected data. As described above, the recommended sequence of shaping functions can be based on a table of the selected data, a data class of the selected data, a data format of the selected data, and/or a current time, for example.

For example, if the user selects source data of the format "@ @ @-####," then, as described above, one suggested sequence of shaping functions can perform splitting "@ @ @-####" into two parts, perform a lookup for a country code based on "@ @ @," and add a column called "Country_name" for the country that is looked up. In this example, one or more embodiments of the present invention determine whether a column of the selected data has a format "@ @ @-####" and, if so, then one or more embodiments of the present invention recommends the corresponding shaping functions to transform the data as described above.

In another example, suppose that a user selects data of a type "Person Name" and a column of type "Zip code," then a suggested sequence of shaping functions will mask the column of type "Person Name." In this example, one or more embodiments of the present invention determine whether a column has a column "Person Name" and a column of type "Zip code." One or more embodiments of the present invention will then recommend the corresponding shaping functions to transform the data as described above.

FIG. 1 illustrates a flowchart for recommending shaping functions in accordance with one or more embodiments of the present invention. After a current user selects data to transform, at 110 a recommendation engine can receive inputs and perform processing in order to generate at least one shaping function to recommend to the user. At 110, the recommendation engine can receive a plurality of patterns of shaping functions 101 that have been chosen by previous users (where the patterns of shaping functions 101 were chosen by previous users to transform data that is similar to the data that is selected by the current user). The recommendation engine can also receive a sequence of chosen shaping functions 102 as chosen by a current user. The sequence of chosen shaping functions 102 can begin with the selection of data by the current user, as described in more detail below. In addition to the selection of data by the current user, the sequence of chosen shaping functions 102 can also reflect shaping functions that were selected by the current user, as described in more detail below.

Upon receiving the inputs, at 110, the recommendation engine can process the inputs and generate one or more recommendations 111 of shaping functions for the user to perform. For example, in the example of FIG. 1, based on the inputs 101 and 102, the recommendation engine has generated three shaping functions to recommend to the user. One or more embodiments of the present invention can recommend more or less than three recommended shaping functions. The first recommended shaping function performs the function of trimming white spaces from the beginning and end of the selected data. For example, suppose that the user has selected data with data corresponding to "alan turing". The first recommended shaping function would remove white space from the beginning and end of "alan turing" to provide the result "alan turing". Further, as shown in FIG. 1, the second recommended shaping function performs capitalization of strings within the data. The third recommended shaping function performs capitalization of the first string within the data. As shown in FIG. 1, when displaying the one or more recommendations 111 of shaping functions, one or more embodiments of the present invention can display an example of how each recommended shaping function, if applied, would modify the selected data. By viewing an example of how each recommended shaping function would be applied, the current user can more readily determine which recommended shaping function to apply.

At 120, the user can decide whether to select one or none of the recommended functions. If the user decides to select none of the recommended shaping functions, then the process can end without applying any further shaping functions. On the other hand, if the user selects a recommended shaping function, then the shaping function can be applied to the relevant data, and, at 140, the sequence of choices (selected by the current user) is updated to include the selected shaping function. Thus, input 102 is also updated to include the selected shaping function.

Figure 2:
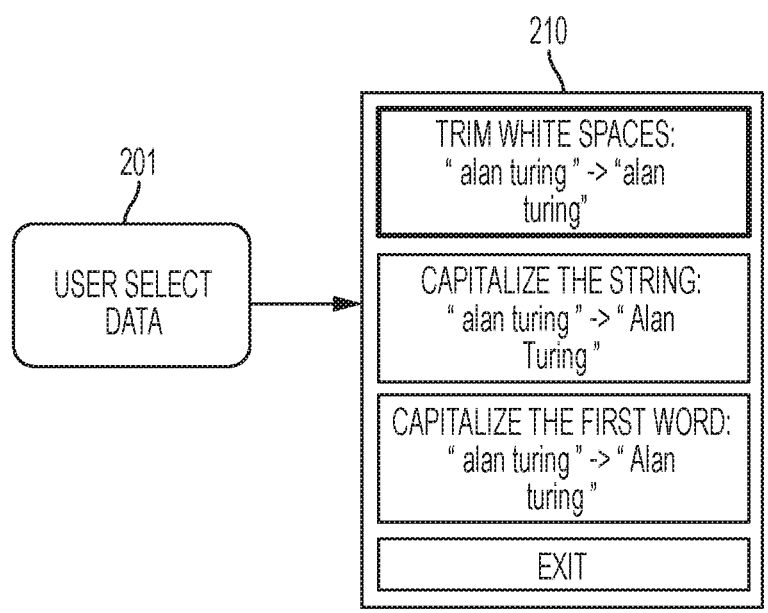
FIG. 2 illustrates recommending a first set of shaping functions after a user selects data in accordance with one or embodiments of the present invention.

FIG. 2 illustrates recommending shaping functions after a user selects data in accordance with one or more embodiments of the present invention. In the example of FIG. 2, at 201, the user can select one or more portions of source data. For example, the user can select a field, a row, a column, a table, etc., of data. Based on the selection of 201, a computer-implemented recommendation engine can provide one or more recommended shaping functions to the user, as described above. The recommendation engine can recommend the shaping functions based on the shaping functions that were chosen by previous users who also selected data similar to the data selected in 201, as described above. For example, one or more embodiments of the present invention can recommend shaping functions based on the shaping functions that were chosen by previous users who selected a similar data format. In the example of FIG. 2, one or more embodiments of the present invention recommend shaping functions that perform: (1) trimming white spaces, (2) capitalizing a string, and (3) capitalizing a first word. Next, suppose that the user selects the recommended shaping function that trims white spaces.

Figure 3:
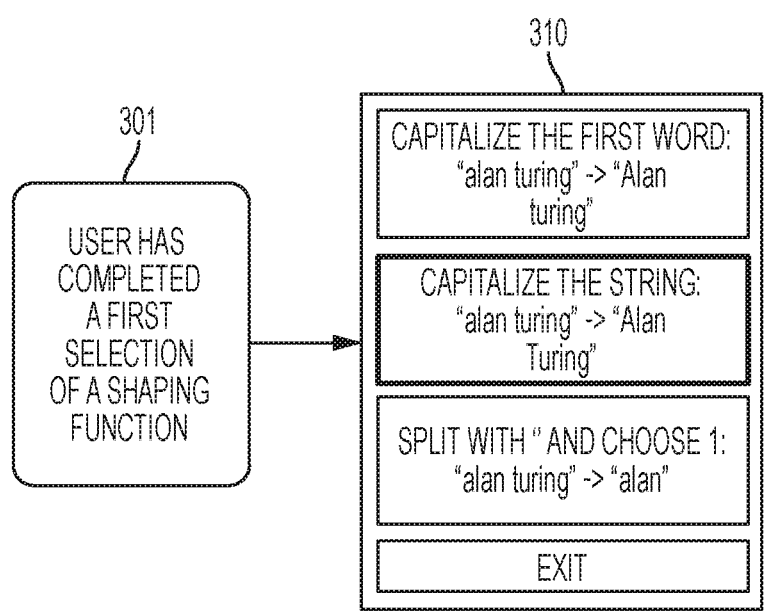
FIG. 3 illustrates recommending additional shaping functions after the user has completed a first selection of a shaping function in accordance with one or more embodiments of the present invention.

After the user selects the recommended shaping function that trims white spaces, then the user has completed a first selection of a shaping function. FIG. 3 illustrates recommending additional shaping functions after a user has completed the first selection of a shaping function in accordance with one or more embodiments of the present invention. After completing the first selection of a shaping function at 301, the computer-implemented recommendation engine can provide additional recommended shaping functions to the user. The recommendation engine can recommend the shaping functions based on the shaping functions that were chosen by previous users who also selected a sequence of functions that are similar to the sequence that is selected by the current user. The recommendation engine can also recommend shaping functions based on a formatting or datatype of the data after the first selection of shaping function is applied. In the example of FIG. 3, one or more embodiments of the present invention recommend shaping functions that perform: (1) capitalizing a first string, (2) capitalizing strings, and (3) splitting the strings and choosing the first string. Suppose that the user selects the recommended shaping function that capitalizes strings.

Figure 4:
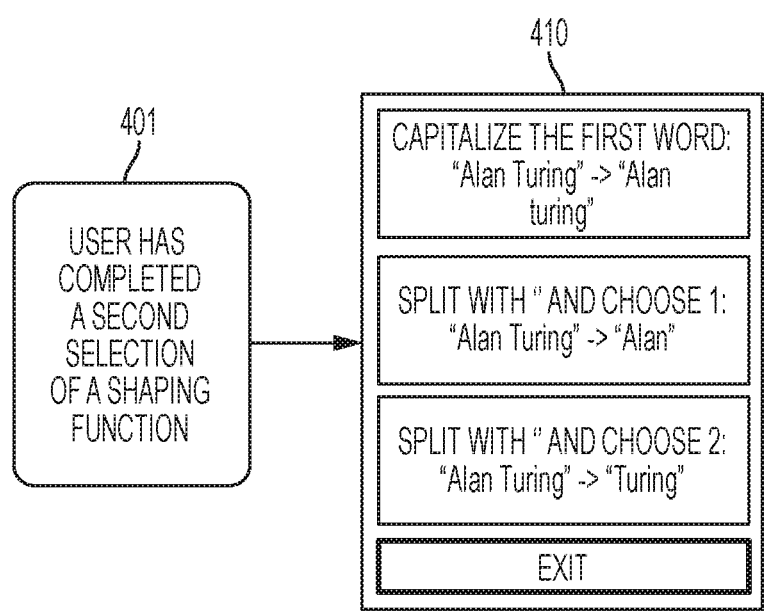
FIG. 4 illustrates recommending additional shaping functions after the user has completed a second selection of a shaping function in accordance with one or more embodiments of the present invention.

After the user selects the recommended shaping function that capitalizes strings, then the user has completed a second selection of a shaping function. FIG. 4 illustrates recommending additional shaping functions after a user has completed the second selection of a shaping function in accordance with one or more embodiments of the present invention. After completing the second selection of a shaping function at 401, the computer-implemented recommendation engine can provide additional recommended shaping functions to the user. The recommended shaping functions can be the same or different than the previously recommended shaping functions (210, 310). In the example of FIG. 4, one or more embodiments of the present invention recommend shaping functions that perform: (1) capitalizing a first string, (2) splitting the strings and choosing the first string, and (3) splitting the string and choosing the second string. Suppose that the user decides to not select any of the recommended shaping functions.

Users who use one or more embodiments of the present invention can be considered as tenants of the data integration platform. Because a plurality of tenants can be using the data integration platform, where each tenant can have its own proprietary methods and information, one or more embodiments of the present invention need to ensure that the proprietary method/information of one tenant is not inadvertently shared with another tenant. As such, when recommending shaping functions to one tenant, the recommended shaping functions cannot be based on any proprietary methods/information of another tenant.

In order to ensure that recommended shaping functions (that are recommended to a first tenant) are not based on any proprietary methods/information (of a second tenant), one or more embodiments of the present invention can ensure that specific table/column names or database names of each tenant are not accessible to other tenants. Further, with one or more embodiments of the present invention, a set of shaping functions that are learned based on specific tables/column names or database names of a tenant are accessible to only that same tenant.

When using machine learning to learn patterns of shaping functions to recommend, one or more embodiments of the present invention can train a machine learning engine (such as, for example, the computer implemented recommendation engine) using data class, time, data format, data type, table, etc., as feature vectors/inputs.

As discussed above, because each tenant can have its own proprietary methods and information, one or more embodiments of the present invention need to ensure that the proprietary method/information of one tenant is not inadvertently shared with another tenant. As such, certain learned patterns of shaping functions can be shared across different tenants (i.e., cross-tenant patterns), while other learned patterns of shaping functions cannot be shared across different tenants (i.e., tenant-specific patterns). Therefore, one or more embodiments of the present invention will generate/learn two types of patterns of shaping functions. For example, cross-tenant patterns can be learned patterns that are not based on any specific table/column names of a tenant. As such, cross-tenant patterns can be shared across different tenants. On the other hand, tenant-specific patterns can be learned patterns that are based on specific table/column names of a tenant. As such, tenant-specific patterns can only be shared with the tenant from who the tenant-specific pattern was learned.

One or more embodiments of the present invention can enable a user to more effectively determine one or more shaping functions to choose in order to transform a selected data. One or more embodiments of the present invention can enable a user to select proper shaping functions by providing a set of recommended shaping functions and by displaying examples of applying each function upon the selected data.

Figure 5:
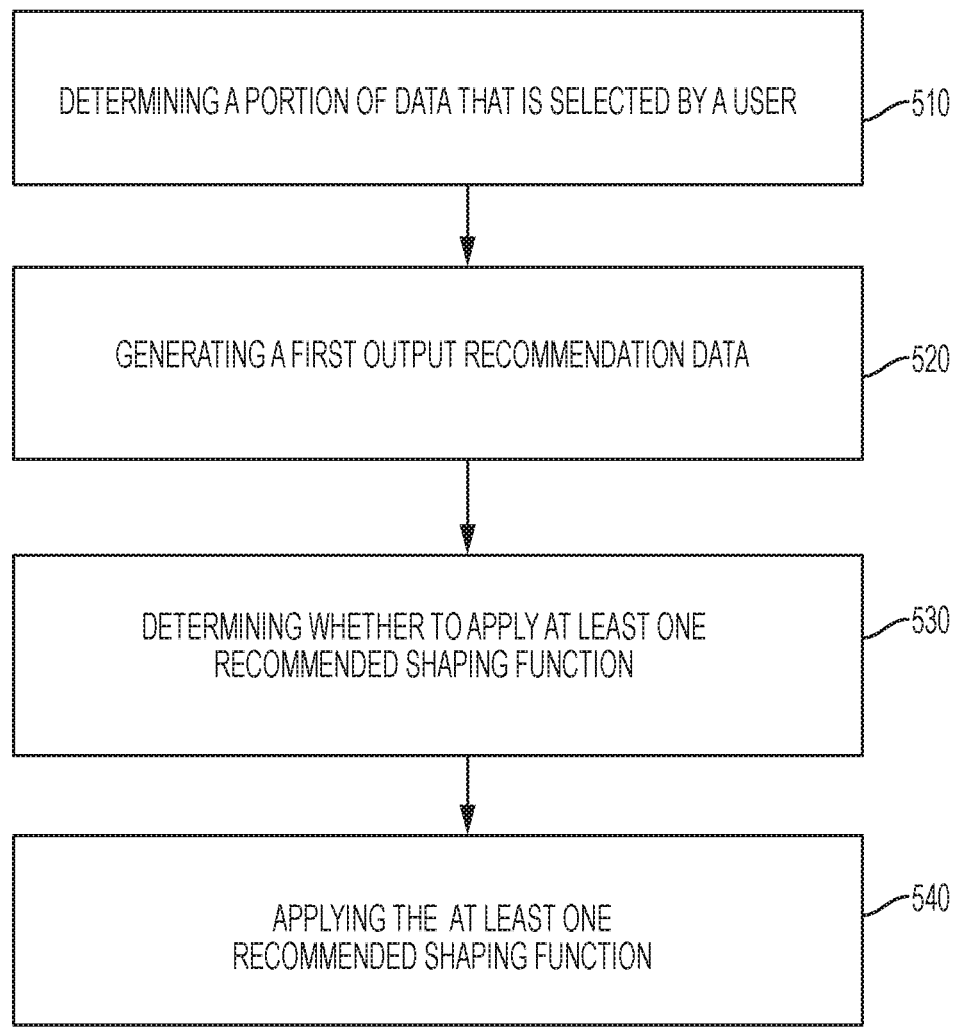
FIG. 5 depicts a flowchart of a method, in accordance with one or more embodiments of the present invention.

FIG. 5 depicts a flowchart of a method in accordance with one or more embodiments of the present invention. The method of FIG. 5 can be performed by a controller of a system that is configured to provide recommendations for shaping functions. The method of FIG. 5 can be performed by an application server. For example, the method of FIG. 5 can be performed by a processor of an application server of a data integration platform. The application server can be a special-purpose application server that performs the specific functionality illustrated by FIG. 5. The method includes, at block 510, determining, by a controller, a portion of data that is selected by a user. The portion of data includes source data that is to be transformed by at least one shaping function. The method also includes, at block 520, generating, by the controller, a first output recommendation data that communicates at least one recommended shaping function to apply to the portion of data. The first output recommendation data is generated based on patterns of shaping functions that have been previously chosen. The method also includes, at block 530, determining whether to apply the at least one recommended shaping function to the portion of data. The method also includes, at block 540, applying the at least one recommended shaping function based on the determining.

Figure 6:
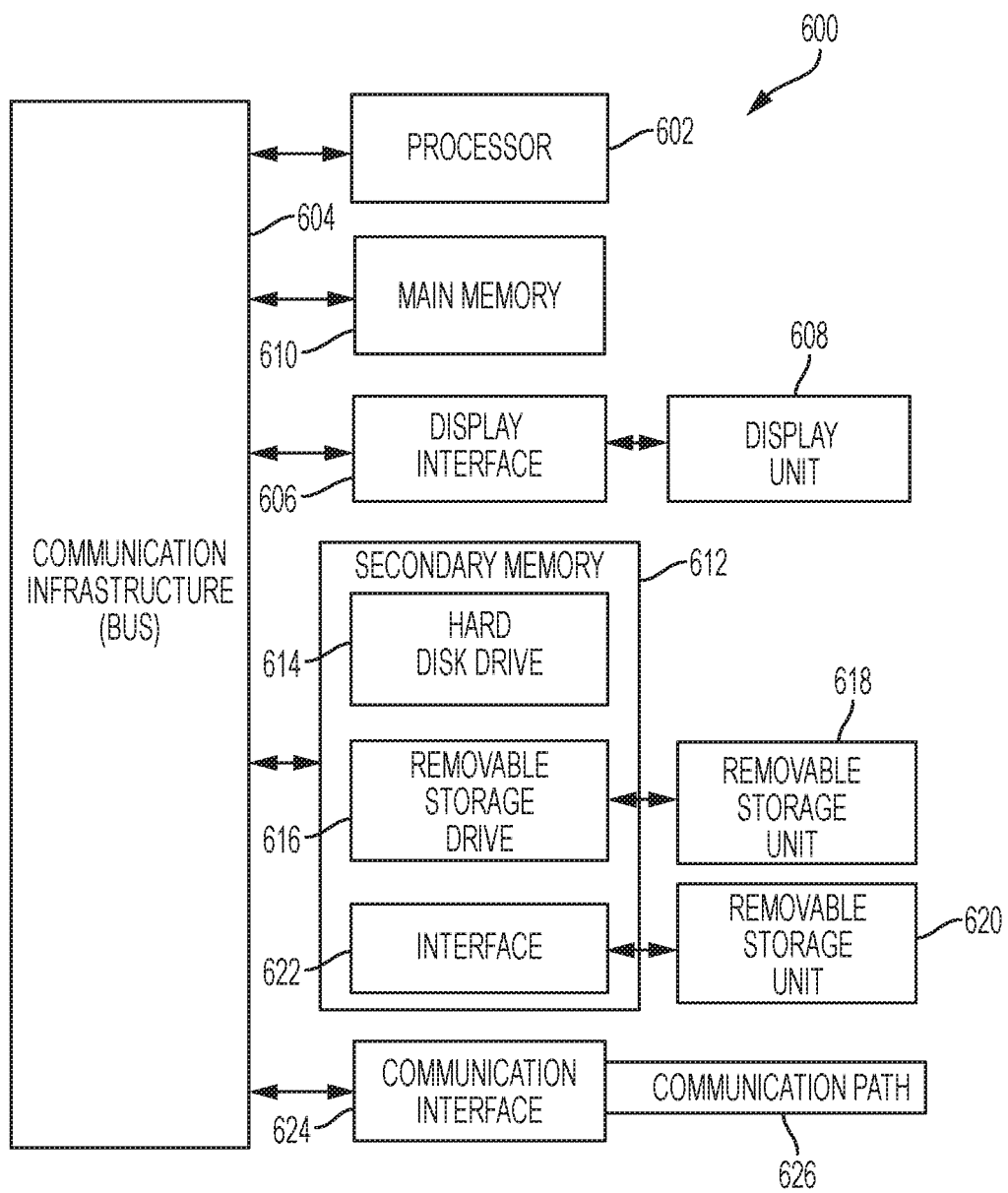
FIG. 6 depicts a high-level block diagram of a computer system, which can be used to implement one or more embodiments of the present invention.

FIG. 6 depicts a high-level block diagram of a computer system 600, which can be used to implement one or more embodiments of the present invention. Computer system 600 can correspond to, at least, an application server of a data integration platform, for example. Computer system 600 can be used to implement hardware components of systems capable of performing methods described herein. Although one exemplary computer system 600 is shown, computer system 600 includes a communication path 626, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 626, e.g., to communicate data between them.

Computer system 600 includes one or more processors, such as processor 602. Processor 602 is connected to a communication infrastructure 604 (e.g., a communications bus, cross-over bar, or network). Computer system 600 can include a display interface 606 that forwards graphics, textual content, and other data from communication infrastructure 604 (or from a frame buffer not shown) for display on a display unit 608. Computer system 600 also includes a main memory 610, preferably random access memory (RAM), and can also include a secondary memory 612. Secondary memory 612 can include, for example, a hard disk drive 614 and/or a removable storage drive 616, representing, for example, a floppy disk drive, a magnetic tape drive, or an optical disc drive. Hard disk drive 614 can be in the form of a solid state drive (SSD), a traditional magnetic disk drive, or a hybrid of the two. There also can be more than one hard disk drive 614 contained within secondary memory 612. Removable storage drive 616 reads from and/or writes to a removable storage unit 618 in a manner well known to those having ordinary skill in the art. Removable storage unit 618 represents, for example, a floppy disk, a compact disc, a magnetic tape, or an optical disc, etc. which is read by and written to by removable storage drive 616. As will be appreciated, removable storage unit 618 includes a computer-readable medium having stored therein computer software and/or data.

In alternative embodiments of the present invention, secondary memory 612 can include other similar means for allowing computer programs or other instructions to be loaded into the computer system. Such means can include, for example, a removable storage unit 620 and an interface 622. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 620 and interfaces 622 which allow software and data to be transferred from the removable storage unit 620 to computer system 600.

Computer system 600 can also include a communications interface 624. Communications interface 624 allows software and data to be transferred between the computer system and external devices. Examples of communications interface 624 can include a modem, a network interface (such as an Ethernet card), a communications port, or a PC card slot and card, a universal serial bus port (USB), and the like. Software and data transferred via communications interface 624 are in the form of signals that can be, for example, electronic, electromagnetic, optical, or other signals capable of being received by communications interface 624. These signals are provided to communications interface 624 via a communication path (i.e., channel) 626. Communication path 626 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 610 and secondary memory 612, removable storage drive 616, and a hard disk installed in hard disk drive 614. Computer programs (also called computer control logic) are stored in main memory 610 and/or secondary memory 612. Computer programs also can be received via communications interface 624. Such computer programs, when run, enable the computer system to perform the features discussed herein. In particular, the computer programs, when run, enable processor 602 to perform the features of the computer system. Accordingly, such computer programs represent controllers of the computer system. Thus it can be seen from the foregoing detailed description that one or more embodiments of the present invention provide technical benefits and advantages.

Figure 7:
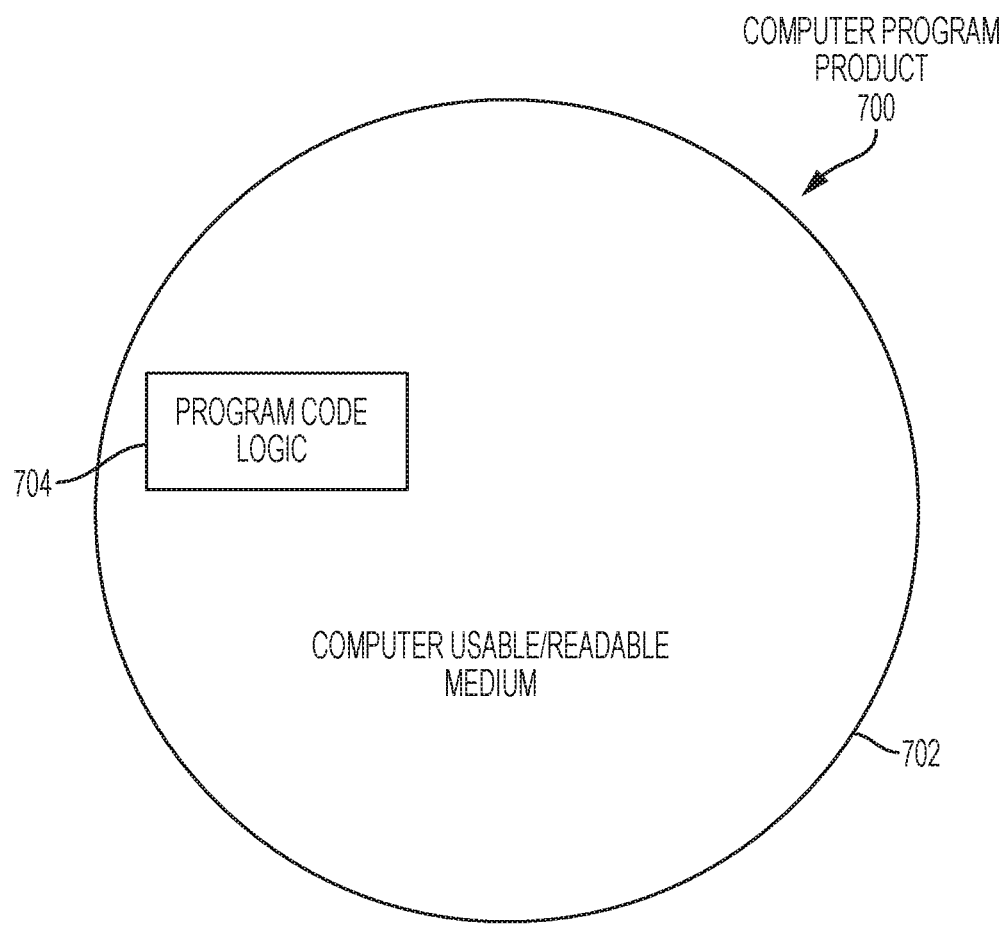
FIG. 7 depicts a computer program product, in accordance with one or more embodiments of the present invention.

FIG. 7 depicts a computer program product 700, in accordance with an embodiment. Computer program product 700 includes a computer-readable storage medium 702 and program instructions 704.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the present invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method to integrate source data within a target repository, the method comprising:
    determining, by a controller, a portion of data that is selected by a user, wherein the portion of data comprises the source data that is to be transformed by at least one shaping function;
    generating, by the controller, a output recommendation data that communicates a sequence of recommended shaping functions to apply to the portion of data, wherein the output recommended data includes a first recommended shaping function and a second recommended shaping function that are generated based on patterns of shaping functions that have been previously chosen, and wherein the generating the output recommended data comprises displaying an example result of applying the sequence of recommended shaping functions on the portion of data that is selected by the user;
    determining whether to apply the at least one recommended shaping function to the portion of data; and
    applying the sequence of recommended shaping functions based on the determining
    wherein the output recommendation data is prevented from being based on proprietary information of another user.

2. The computer-implemented method of claim 1, wherein the portion of data comprises source data that is to be transformed by an extract, transform, and load process of a data integration platform.

3. The computer-implemented method of claim 1, wherein the output recommendation data is generated based on a characteristic of the portion of data that is selected by the user.

4. The computer-implemented method of claim 1, wherein the output recommendation data is generated based on a data format or a data class of the portion of data.

5. The computer-implemented method of claim 1, wherein the applying the sequence of recommended shaping functions further comprises at least one of performing a lookup and joining one or more tables.

6. A computer system to integrate source data within a target repository, computer system comprising:
    a memory; and
    a processor system communicatively coupled to the memory;
    the processor system configured to perform a method comprising:
        determining a portion of data that is selected by a user, wherein the portion of data comprises the source data that is to be transformed by at least one shaping function;
        generating a output recommendation data that communicates at sequence of recommended shaping functions to apply to the portion of data, wherein the output recommended data includes a first recommended shaping function and a second recommended shaping function that are generated based on patterns of shaping functions that have been previously chosen, and wherein the generating the output recommended data comprises displaying an example result of applying the sequence of recommended shaping functions on the portion of the data that is selected by the user;
        determining whether to apply the at least one recommended shaping function to the portion of data; and
        applying the sequence of recommended shaping functions based on the determining;
    wherein the output recommendation data is prevented from being based on proprietary information of another user.

7. The computer system of claim 6, wherein the portion of data comprises source data that is to be transformed by an extract, transform, and load process of a data integration platform.

8. The computer system of claim 6, wherein the first output recommendation data is generated based on a characteristic of the portion of data that is selected by the user.

9. The computer system of claim 6, wherein the first output recommendation data is generated based on a data format or a data class of the portion of data.

10. The computer system of claim 6, wherein the applying the sequence of recommended shaping function further comprises at least one of performing a lookup and joining one or more tables.

11. A computer program product to integrate source data within a target repository, the computer program product comprising a computer-readable storage medium having program instructions embodied therewith, the program instructions readable by a processor system to cause the processor system to:
    determine a portion of data that is selected by a user, wherein the portion of data comprises the source data that is to be transformed by at least one shaping function; generate a output recommendation data that communicates sequence of recommended shaping function to apply to the portion of data, wherein the output recommendation data includes a first recommended shaping functions and a second recommended shaping function that are generated based on patterns of shaping functions that have been previously chosen, and wherein in generating the output recommendation data comprises displaying an example result of applying the sequence of recommended shaping functions on the portion of data that is selected by the user;
determine whether to apply the sequence of recommended shaping function to the portion of data; and
apply the sequence of recommended shaping functions based on the determining;
wherein the output recommendation data is prevented from being based on proprietary information of another user.

12. The computer program product of claim 11, wherein the portion of data comprises source data that is to be transformed by an extract, transform, and load process of a data integration platform.

13. The computer program product of claim 11, wherein the output recommendation data is generated based on a characteristic of the portion of data that is selected by the user.

14. The computer program product of claim 11, wherein the output recommendation data is generated based on a data format or a data class of the portion of data.

15. The computer program product of claim 11, wherein applying the sequence of recommended shaping function further comprises at least one of performing a lookup and joining one or more tables.

* * * * *